UNITED STATES PATENT OFFICE.

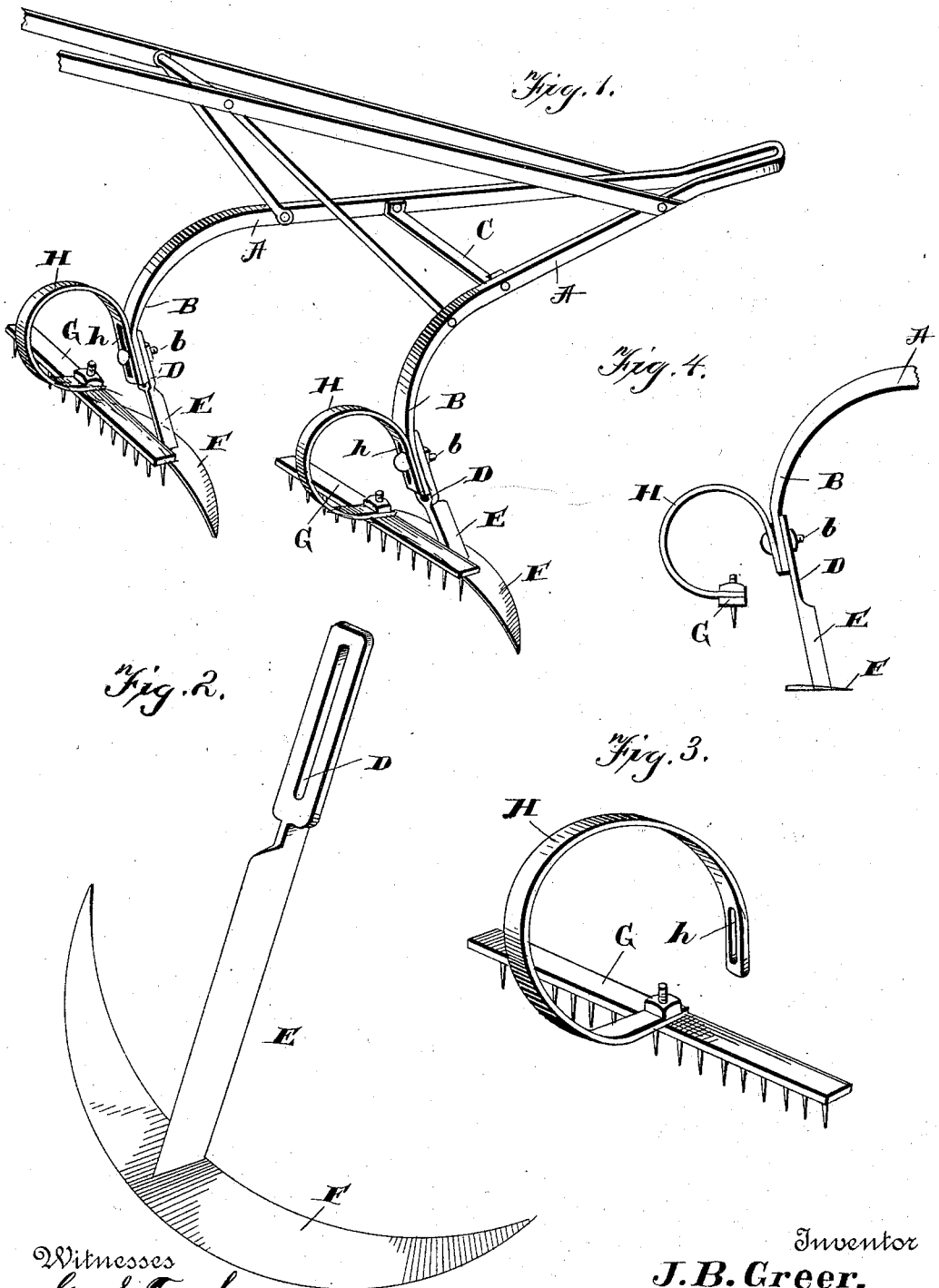

JEROME B. GREER, OF WARRENSBURG, MISSOURI.

CULTIVATOR.

SPECIFICATION forming part of Letters Patent No. 598,420, dated February 1, 1898.

Application filed April 7, 1897. Serial No. 631,130. (No model.)

*To all whom it may concern:*

Be it known that I, JEROME B. GREER, of Warrensburg, in the county of Johnson and State of Missouri, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

This invention relates to cultivators; and the object is to provide a shovel or blade attachment of simple and improved form which may be readily attached to any form of cultivator-stock for working deep or shallow, as desired, without unnecessarily agitating the surface of the ground, whereby the implement may be used in wet ground without danger of baking. It is also especially adapted for early cultivating when the plants are quite young and small, and which with an ordinary form of cultivator would be covered or injured by too much stirring of the ground-surface. The attachment, acting in the manner of a subsoiler, creates an underbreaking of the ground adjacent the plant-roots and creates an underground drain, so that the plant-roots may be effectually irrigated.

A further object is to provide the cultivator with a harrow or rake attachment of improved form for pulling any grass and weeds from the ground which may be cut loose by the shovels or blades.

With these and other objects in view, as will presently appear, the invention resides in the novel features of construction and in the combination and construction of parts hereinafter fully described and claimed, and illustrated by the accompanying drawings, in which—

Figure 1 is a perspective view of a cultivator provided with my improved attachments. Fig. 2 is a detail view of one of the shovel or blade attachments. Fig. 3 is a similar view of the rake attachment. Fig. 4 is a side elevation of the blade and rake in position.

A designates the rearwardly-diverging beams, formed of a single piece of bar-iron doubled, as shown, and B are the stocks, formed by curving downward the rear ends of the beams, the latter being connected by cross-bar C.

Each shovel or blade consists of an upright or shank portion slotted at its upper end, as shown at D, to receive the bolt for adjustably attaching to the stock, or, if preferred, a clamp may be used as a securing means. Beneath the slotted portion the shank is sharpened to form the advancing cutting-blade E. At the lower end of this blade is the horizontal blade or cutter F, of elliptical form, the same being united centrally with the upright blade, with the convex edge in advance, as shown.

When in use, the curved horizontal blade is beneath the surface and effects a most complete underground or subsoil agitation, while vertical blade E simply advances through the surface, cutting and slightly agitating the same, but not sufficiently to cause the ground to bake if worked when wet or to disturb young tender plants just up. The ground adjacent the plant-roots is thoroughly loosened, so as to effectually drain.

To the rear of each cutter and above the plane of horizontal portion F is a rake G of substantially the same length as the said cutter F and adapted to level or smooth the surface, as well as remove any loose weeds. Each rake is held in proper position by a forwardly-curved spring H, which is slotted at its forward depending end, as shown at h, where it is adjustably secured by bolt b to the back of the stock, one bolt thus serving to secure the cutter and rake. The spring serves to hold the rake in place, and at the same time permits it to yield independently of the blade and stock when necessary, as when immovable obstructions, such as grubs and stumps, are encountered.

Having thus fully described my invention, what I claim as new, and desire to secure by Letters Patent, is—

1. An improved cultivator-blade consisting of a bar having its lower portion flattened to form cutting edge E, and its upper portion flattened at right angles to said blade portion, said upper portion being longitudinally slotted to pass a bolt for securing it in desired adjustment to a plow-stock, substantially as shown and described.

2. The combination with a cultivator-stock, of elliptical spring H having its forward downwardly-disposed end bearing against the stock and there secured, the opposite end of the spring being curved downward and extended forward in a substantially horizontal plane toward the stock, and rake G having its back engaged flatly with the horizontally-disposed portion of the spring and secured thereto, substantially as shown and described.

3. A cultivator-blade, consisting of a shank portion substantially vertical and slotted at its upper portion to receive a securing-bolt, the shank beneath said slotted portion being flattened to form the advancing cutting-blade, and a horizontally-arranged subsoiling-blade at the lower end of the upright blade, substantially as shown and described.

4. The combination with a cultivator-stock, of a cutter having an elongated vertical edge and made transversely flat and slotted above the edge, said flat portion adapted to bear against the forward side of the stock, the transverse elliptical blade at the base of the upright blade, elliptical spring H slotted at its downwardly-disposed upper end where it is adapted to bear against the rear side of the stock, a single bolt extending through the stock, the spring and the cutter for securing said parts together, and the transversely-extending rake secured to the lower forwardly-disposed end of the spring, substantially as shown and described.

In testimony whereof I affix my signature in presence of two witnesses.

JEROME B. GREER.

Witnesses:
ROBBERT M. LEAR,
GEORGE W. TEDDER.